US011091269B2

(12) United States Patent
  Guillet

(10) Patent No.: US 11,091,269 B2
(45) Date of Patent: Aug. 17, 2021

(54) FITTING SYSTEM FOR A SEAT

(71) Applicant: ATTAX, Carrieres sur Seine (FR)

(72) Inventor: Elie Stanislas Guillet, Carrieres sur Seine (FR)

(73) Assignee: ATTAX, Carrieres sur Seine (FR)

( * ) Notice: Subject to any disclaimer, the term of this patent is extended or adjusted under 35 U.S.C. 154(b) by 20 days.

(21) Appl. No.: 16/656,531

(22) Filed: Oct. 17, 2019

(65) Prior Publication Data

US 2020/0122841 A1   Apr. 23, 2020

(30) Foreign Application Priority Data

Oct. 17, 2018  (FR) ...................................... 18 59595

(51) Int. Cl.
  *B64D 11/06*   (2006.01)
(52) U.S. Cl.
  CPC ................................ *B64D 11/0696* (2013.01)
(58) Field of Classification Search
  CPC ................................................ B64D 11/0696
  See application file for complete search history.

(56) References Cited

U.S. PATENT DOCUMENTS

| 8,292,224 | B1 * | 10/2012 | Ahad | ................. | B64D 11/0696 244/118.6 |
| 2011/0278422 | A1 * | 11/2011 | Marechal | ........... | B64D 11/0696 248/503.1 |

FOREIGN PATENT DOCUMENTS

| DE | 10 2011 013 688 A1 | 9/2011 |
| DE | 102011013688 | 9/2011 |
| EP | 2 974 962 A1 | 1/2016 |
| EP | 2974962 A1 | 1/2016 |
| FR | 3 005 451 A1 | 11/2014 |
| FR | 3005451 A1 | 11/2014 |
| FR | 3 023 828 A1 | 1/2016 |
| FR | 3023828 A1 | 1/2016 |
| WO | WO-2014114680 A1 * | 7/2014 ......... B64D 11/0696 |

OTHER PUBLICATIONS

Preliminary Search Report in French Patent Application No. 1859595 dated Aug. 28, 2019.
Search Report issued in GB application No. GB1914845.1, dated Jun. 10, 2020.
Search Report issued in FR application No. 1859595 dated Aug. 28, 2019.

* cited by examiner

*Primary Examiner* — Anthony D Barfield
(74) *Attorney, Agent, or Firm* — Knobbe, Martens Olson & Bear LLP

(57) ABSTRACT

A fastening system for a seat includes a base associated with the rest of the seat and including a grip for attachment by gripping of the seat on the rail, movable between a free position and an active attachment position of the seat, via a maneuvering lever movable between a free position and an active position for blocking in the active position of the grip. The system includes a lock for locking the lever in the active blocking position. The lock includes an axle that is rotatable relative to one of the lever and the base between an unlocked position and a locked position. The axle is provided with an indexing element provided to engage with a complementary portion of the other of the lever and the base in the locked position of the axle.

12 Claims, 6 Drawing Sheets

FITTING SYSTEM FOR A SEAT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to a fastening system for a seat, for example an aircraft seat, in a rail of the rest of that aircraft.

Description of the Related Art

This type of seat fastening system is well known in the state of the art. Reference may for example be made to document FR 3,023,828 in the applicant's name.

In general, this type of fastening system includes a base associated with the rest of the seat and including means for attachment by gripping the latter on the rail of the aircraft.

These attachment means can be moved between a retracted assembly/disassembly position of the seat and an active attachment position thereof, for example by an operator, by means of a maneuvering lever movable between retracted assembly/disassembly and active position-blocking positions of the attachment means.

Furthermore, this lever includes means for locking in the active blocking position.

These devices have been developed to meet a certain number of requirements relative to safety and ease of assembly and disassembly of the seats in these applications.

The means for locking in the active blocking position for example include latch-forming means supported by the base and means for retaining the lever.

However, these locking means can have play between the latch-forming means and the retaining means. This for example results in vibrations that are then sources of noise that may prove bothersome.

SUMMARY OF THE INVENTION

The invention therefore aims to resolve these problems.

To that end, the invention relates to a fastening system for a seat, for example an aircraft seat, in a rail of the rest of said aircraft, of the type comprising a base associated with the rest of the seat and including means for attachment by gripping of the seat on the rail, movable between a free assembly and/or disassembly position of the seat and an active attachment position of the seat, via a maneuvering lever movable between a free assembly and/or disassembly position and an active position for blocking in the active position of the attachment means, the system including means for locking the lever in the active blocking position, wherein the means for locking in the active blocking position comprise an axial element that is rotatable relative to one of the lever and the base between an unlocked position and a locked position, the axial element being provided with an indexing element provided to engage with a complementary element of the other of the lever and the base in the locked position of the axial element.

The fastening system may further have one or more of the features below, considered individually or according to any technical possible combination(s):
- the indexing element is a locking pin, the complementary element being a slit defined by the other of the lever and the base, the locking pin being provided to cooperate with the slit,
- the slit opens into an upper surface of the other of the lever and the base and comprises a portion extending on a slant relative to said upper surface,
- the axial element is mounted freely rotating on one of the lever and the base, so as only to allow a rotational movement of the axial element around a rotation axis relative to one of the lever and the base,
- the axial element passes through an orifice defined in one of the lever and the base,
- the means for locking in the active blocking position comprise an automatic locking element,
- the automatic locking element comprises a resilient urging member inserted between the axial element and one of the lever and the base, the resilient urging member applying a rotational force to the axial element to drive it in the locked position,
- the resilient urging member is a torsion spring having a first end fastened to the axial element and a second end fastened to one of the lever and the base,
- comprising an element for keeping the axial element in the unlocked position,
- the maintaining element forms a retaining contact with the axial element when the lever is in the free position, the retaining contact opposing the automatic locking element,
- the maintaining element is a cam mounted pivoting on one of the lever and the base, the axial element having a stop element, the cam being provided with a cam spring keeping the cam in contact with the stop element in the free position of the lever so as to oppose the automatic locking element, the cam pivoting in case of movement of the lever into the active position so as to free the automatic locking element,
- comprising retaining means so as to limit the rotational movement of the axial element to a rotation between the unlocked position and the locked position,
- the retaining means comprise a retaining pin secured to one of the lever and the base and a complementary machining on the axial element, the retaining pin being inserted into the machining, the machining having a shape and a size such that it only allows the movement of the axial element between the unlocked position and the locked position,
- the axial element bears locking and/or unlocking information of the system, and/or
- the unlocking information of the system and/or the locking information of the system are configured to be modified in case of rotation of the axial element relative to one of the lever and the base.

BRIEF DESCRIPTION OF THE DRAWINGS

Other features and advantages of the invention will emerge from the detailed description given below, by way of indication and without limitation, with reference to the annexed figures, including.

DETAILED DESCRIPTION OF THE PREFERRED EMBODIMENT

These figures show a fixation device for a seat, for example an aircraft seat, in a rail of the rest of that aircraft.

The system is designated by general reference 10 in these figures and includes a base associated with the rest of the seat.

This base is designated by general reference 12 and for example includes, in its rear part, a lug 14 for fastening part of the seat.

Of course, different connecting methods for connecting the seat to the base can be considered. The seat can thus be integral with the base, connected thereto by an intermediate part, etc.

In its lower part, this base includes protruding heels such as the heel 16, which are part of the composition of the attachment means by gripping this seat on the rail of the aircraft.

Figure 1:
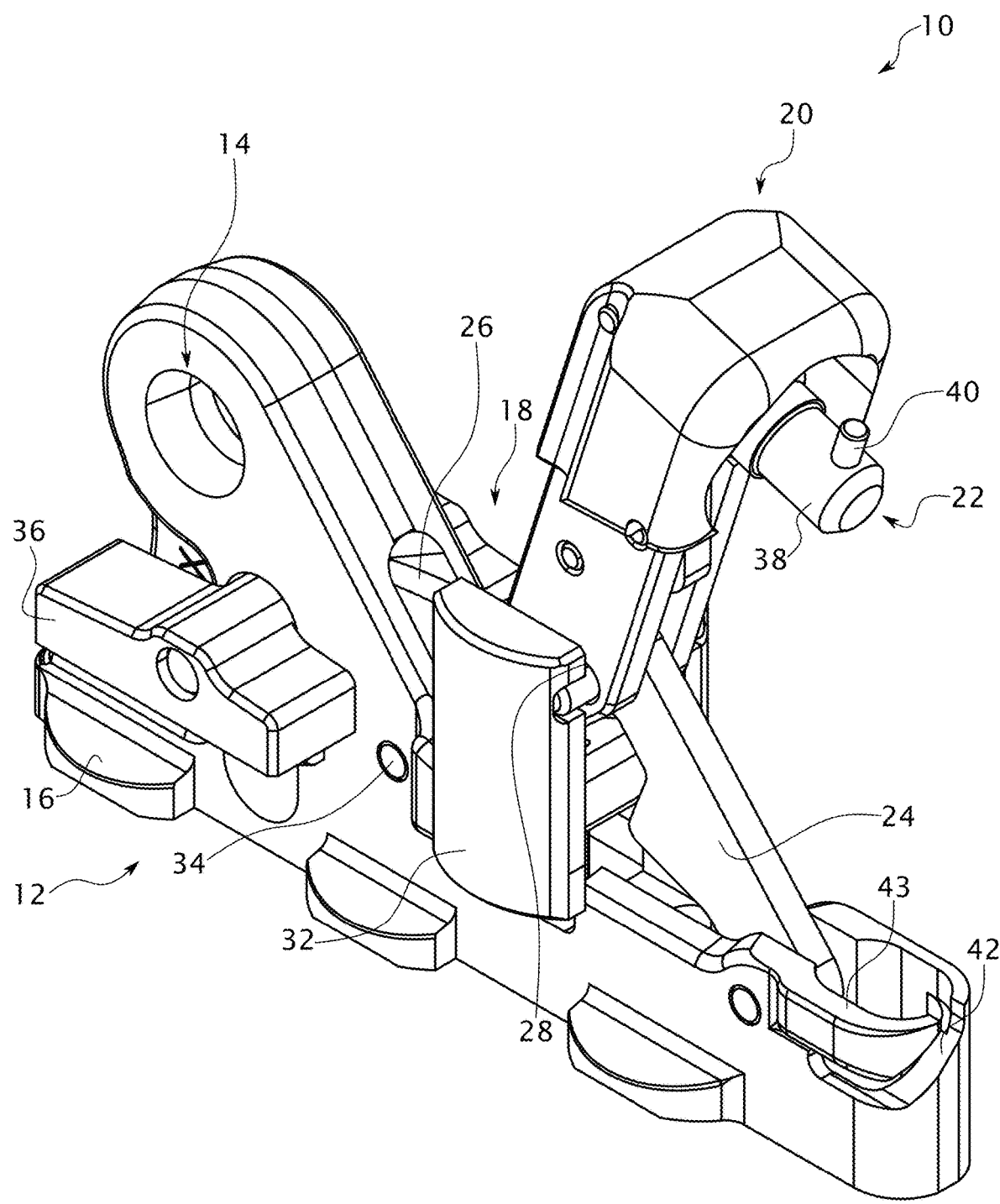
FIG. 1 is a perspective view of a fastening system according to one embodiment of the invention, in which the lever is in the free position.
Figure 2:
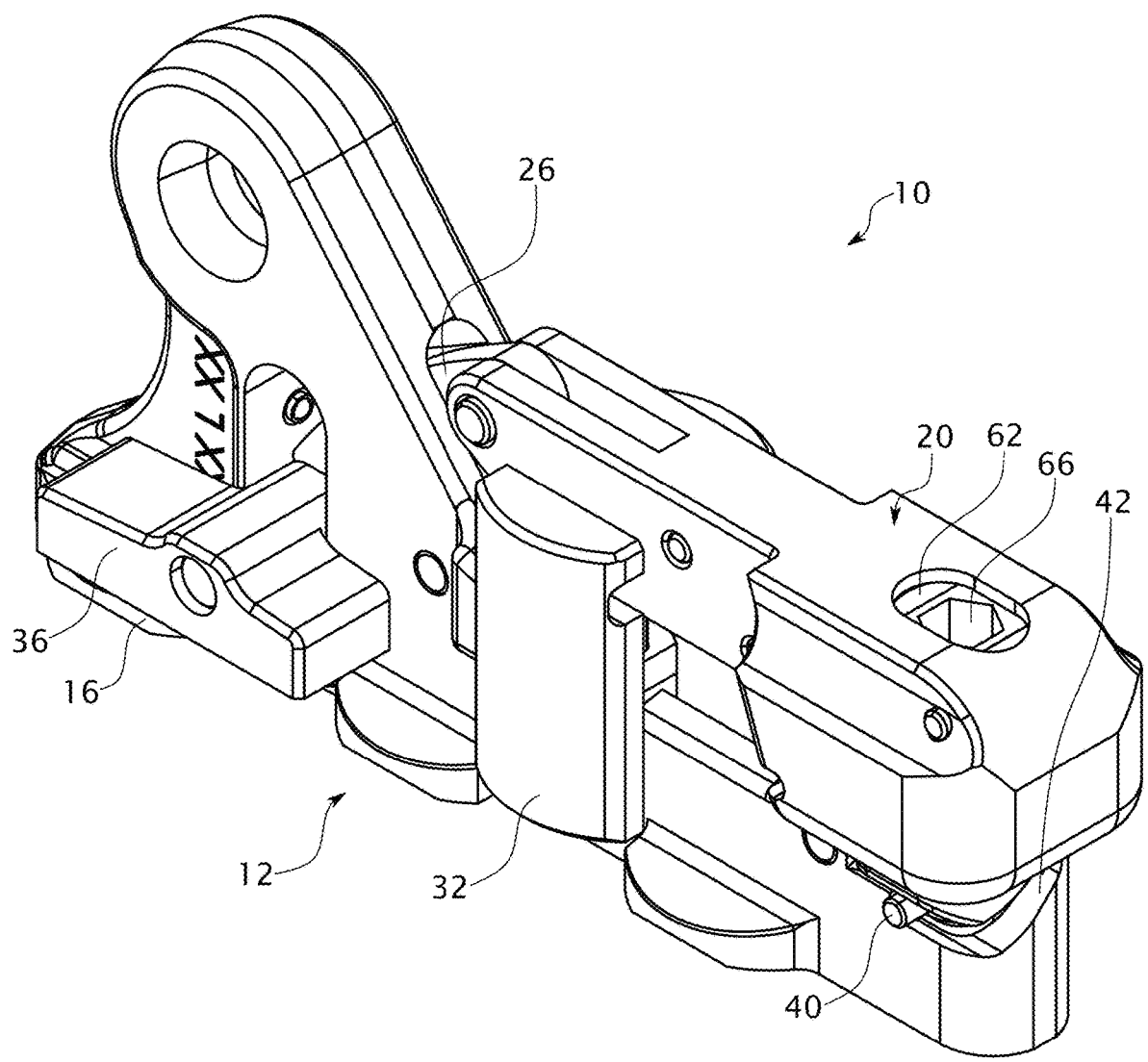
FIG. 2 is a perspective view of the fastening system of FIG. 1, in which the lever is in the active position.
Figure 3:
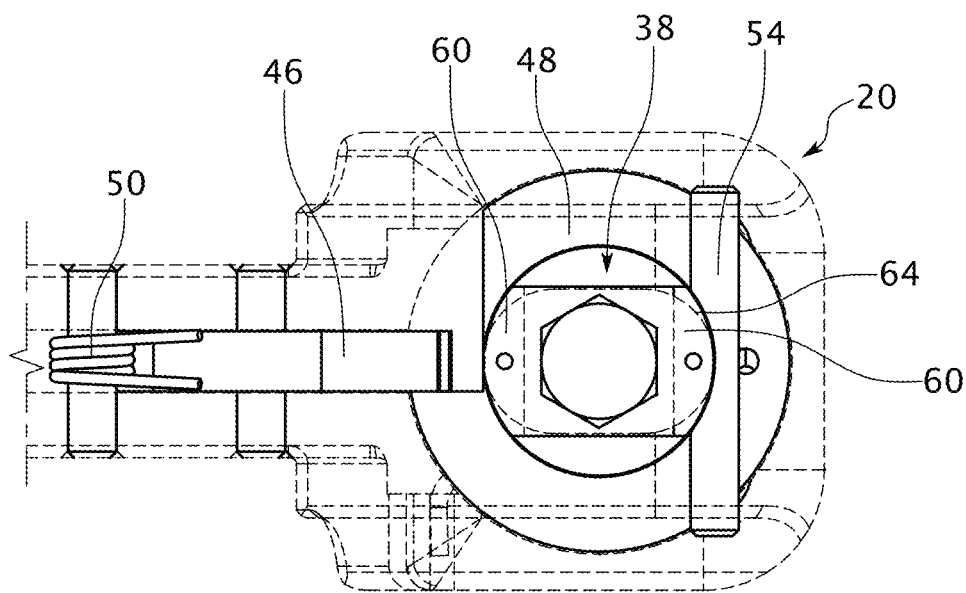
FIGS. 3 and 4 are top and side views of part of the fastening system of FIG. 1, in which the lever is shown transparent, the lever being in the free position.
Figure 4:
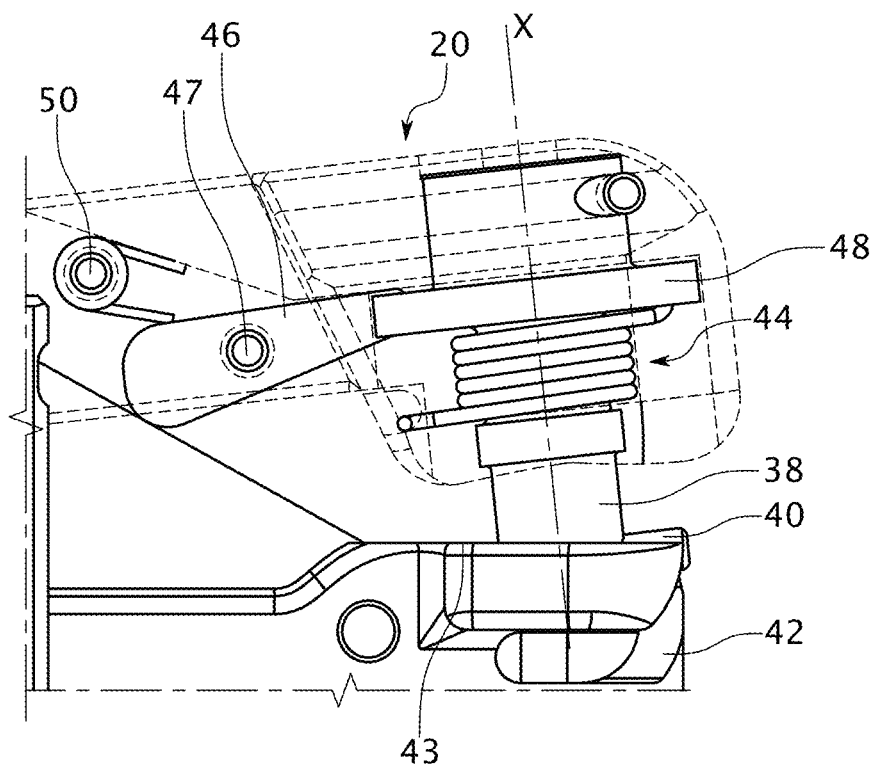
Figure 5:
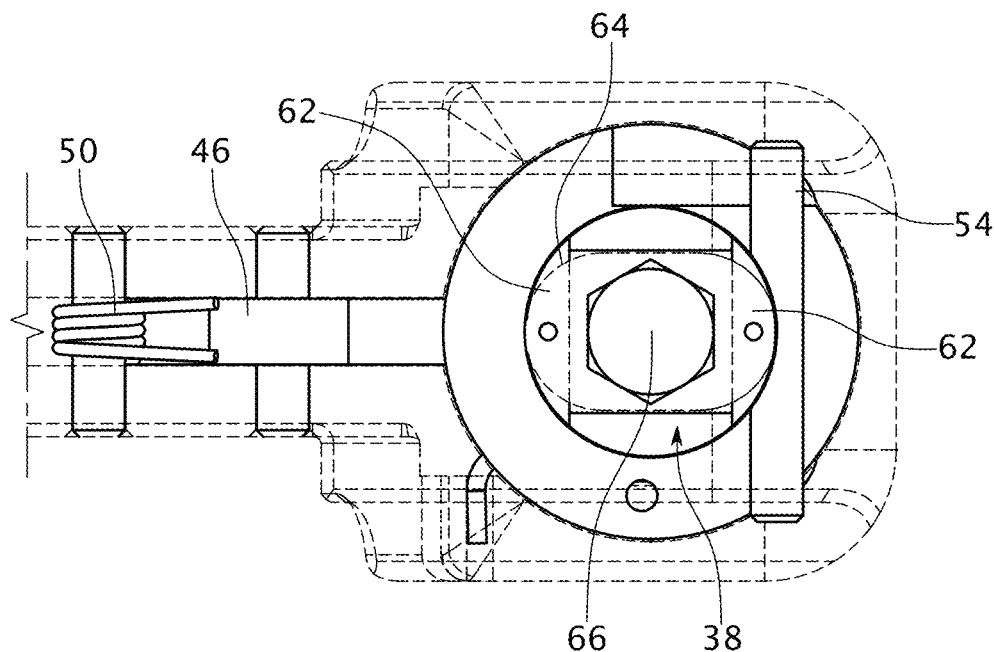
FIGS. 5 and 6 are top and side views of part of the fastening system of FIG. 1, in which the lever is shown transparent, the lever being in the active position.
Figure 6:
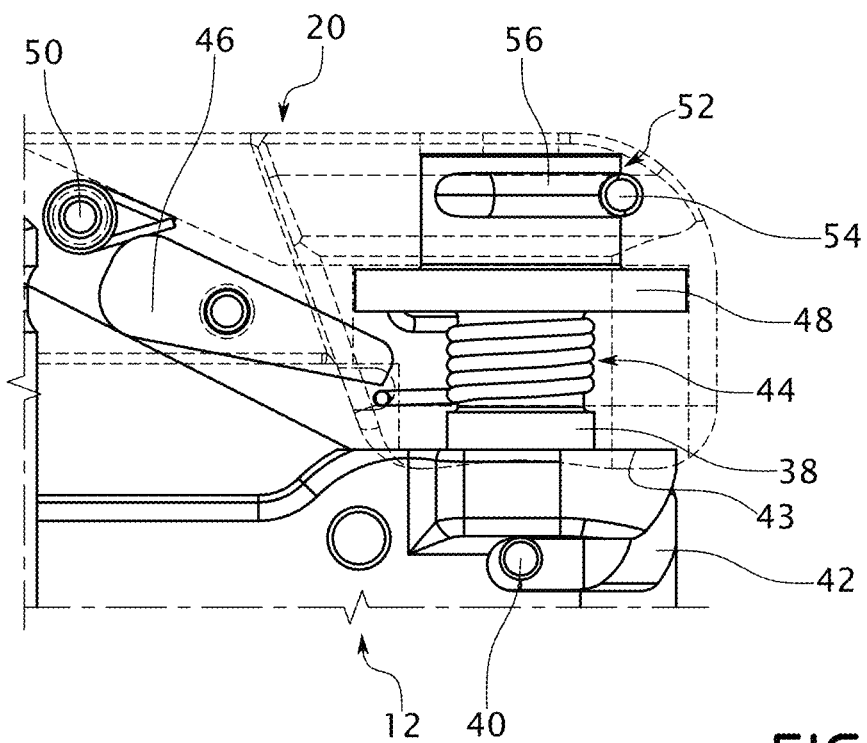

Indeed, the base includes gripping attachment means designated by general reference 18, which are movable, as illustrated, between a free assembly/disassembly position of the seat as illustrated in FIGS. 1, 3 and 4, and an active attachment position thereof as illustrated in FIGS. 2, 5 and 6.

The attachment means are movable via a maneuvering lever designated by general reference 20.

This lever is movable between a free assembly and/or disassembly position illustrated in FIGS. 1, 3 and 4, and an active position for blocking in the active position of the attachment means, illustrated in FIGS. 2, 5 and 6.

As will be described in more detail later, the system also includes means for locking the lever in the active blocking position, designated by general reference 22.

In the illustrated embodiment, the maneuvering lever 20 is associated with means for crossing the hard point for moving the attachment means 18 between the free assembly/disassembly position of the seat and the active attachment position thereof.

Indeed, the maneuvering lever 20 is associated with toggle joint means for crossing the hard point, comprising an articulation yoke for connecting rods 24 and 26 also articulated on the base and at least one of which is associated with the attachment means for the seat to move them between their free and active positions.

In fact, the use of such means for crossing the hard point has several advantages.

One of the advantages of this use is the urging of the system and the absorption of the machining allowance of the parts to avoid generating vibrations or noises, for example.

To that end, in the system according to the invention, buffers made from resilient material, such as an elastomer or other material, are not used.

It is the toggle joint mechanism for crossing hard points, implementing connecting rods, that ensures this urging.

Another advantage of the use of such a system is that the means for crossing a hard point make it possible to positively define the active blocking position of the lever and the attachment means, independently of the safety provided by the means for locking the lever in the blocking position.

In the exemplary embodiment shown in these figures, the attachments for the seat comprise two types of elements, namely means for centering the base on the rail, or even position indexing, and means for gripping the base on the rail.

These means are respectively associated with the connecting rods 24 and 26.

In light of these figures, it in fact appears that the connecting rods comprise a front connecting rod 24, a first end of which is articulated on the base 12, and a second end of which is articulated on the articulation yoke 28. The articulation yoke 28 is suitable for moving centering or even indexing means 32, for example made up of a lateral protruding part mounted to be mechanically movable in the base, between an upper position-adjusting position of the base and a lower active centering or even indexing position in the rail.

In the illustrated example, the connecting rods also include the rear connecting rod 26, a first end of which is articulated on the yoke 28, an intermediate portion of which is for example articulated at 34 on the base, and a second end of which is associated with jaws for gripping the base on the rail, to allow a movement of the jaws between a retracted position and an active position, perpendicular to the rail.

One of these jaws is designated by general reference 36 in the figures.

Alternatively, the maneuvering lever is not associated with means for crossing the hard point for moving the attachment means 18 between the free assembly/disassembly position of the seat and the active attachment position thereof, but with any possible closing and gripping means of the rail.

As previously indicated, the front end of the lever 20 can include means 22 for locking in the active blocking position thereof.

The means for locking in the active blocking position comprise an axial element designated by general reference 38.

The axial element 38 is rotatable relative to the lever 20 between an unlocked position as illustrated in FIGS. 1, 3 and 4 and a locked position as illustrated in FIGS. 2, 5 and 6.

The passage from the unlocked position to the locked position corresponds, for example, to a rotation of one-quarter revolution of the axial element 38 in a given direction.

The axial element is mounted freely rotating on the lever, so as only to allow a rotational movement of the axial element around a rotation axis X relative to the lever.

The axial element extends between a first end and a second end along the rotation axis X. More specifically, the axial element has a cylindrical overall shape having, as main axis, the rotation axis X.

The axial element passes through an orifice defined in the lever. More particularly, the first end of the axial element is inserted into the orifice.

The axial element is provided with an indexing element designated by general reference 40 provided to engage with a complementary element designated by reference 42 of the base in the blocking position of the axial element.

The indexing element is provided near the second end of the axial element.

The indexing element 40 is a locking pin.

The complementary element 42 is a slit defined by the base, the locking pin being provided to cooperate with the slit.

The slit opens into an upper surface 43 of the base.

The slit comprises a portion extending on a slant relative to said upper surface. More particularly, the slit is defined in three portions placed continuously one after the other: one portion perpendicular to the upper surface emerging in said surface at an inlet, the slanted portion, then a portion parallel to the upper surface extending in the extension of the slanted portion. The slanted portion connects the perpendicular portion and the parallel portion.

The means for locking in the active blocking position further comprise an automatic locking element designated by general reference 44.

The automatic locking element 44 comprises a resilient urging member inserted between the axial element 38 and the lever 20.

The resilient urging member here is a torsion spring having a first end fastened to the axial element 38 and a second end fastened to the lever 20, more particularly to a fixed point of the lever.

The torsion spring applies a rotational force to the axial element 38 to drive it to the locked position.

The rotational force applied by the spring is in the direction going from the inlet of the slit to the parallel portion of said slit.

The system further comprises an element for keeping the axial element in the unlocked position. The element for keeping the axial element in the unlocked position is designated by reference 46.

The maintaining element 46 forms a retaining contact with the axial element 38 when the lever 20 is in the free position, the retaining contact opposing the automatic locking element 44. Thus, when the lever 20 is in the free position, the axial element 38 is kept in the unlocked position.

In the illustrated example, the maintaining element 46 comprises a pivot-mounted cam 47 on the lever.

The axial element 38 has a stop element designated by reference 48.

In the illustrated example, the stop element is in the general shape of a ring surrounding the axial element, the ring having a stop-forming cutout. The cutout extends over an outer edge of the ring.

The cam is provided with a cam spring designated by reference 50 keeping the cam in contact with the stop element 48 in the free position of the lever so as to oppose the automatic locking element 44, as shown in FIGS. 3 and 4.

The contact between the stop element 48 and the cam prevents the rotation of the axial element 38 driven by the torsion spring of the automatic locking element.

The cam is a radial transmission cam with outer profile. A first end of the cam is in contact with the cam spring. A second end of the cam is in contact with the stop element when the lever is in the free position.

If the lever is moved into the active position, the cam is provided to pivot so as to free the automatic locking element, as illustrated in FIG. 6.

More particularly, if the lever is moved into the active position, the cam bears against the connecting rod 24 in order to pivot relative to the lever 20 while opposing the cam spring 50. By pivoting, the second end of the cam is no longer in contact with the stop element 48. The cam then releases the stop element and the automatic locking element 44 drives the axial element 38 into the locked position.

The system further comprises retaining means designated by reference 52 so as to limit the rotational movement of the axial element to a rotation between the unlocked position and the locked position.

The retaining means comprise a retaining pin designated by reference 54 secured to the lever and a complementary machining designated by reference 56 on the axial element.

The retaining pin further makes it possible to maintain the first end of the axial element in the lever 20.

The retaining pin is inserted into the machining, the machining having a shape and a size such that it only allows the movement of the axial element between the unlocked position and the locked position.

In the illustrated example, the machining is a peripheral slot of the axial element extending over a portion of a circumference of the axial element. The retaining pin extends tangentially in the slot.

The portion of the circumference corresponding to the slot has a size such that when the retaining pin is at a first end of the slot, then the axial element is in the unlocked position, and when the retaining pin is at a second end of the slot, then the axial element is in the locked position, such that the movement of the pin in the slot only allows the passage from the locked position to the unlocked position or vice versa.

Furthermore, the axial element 38 here bears locking and/or unlocking information of the system.

As illustrated according to a first embodiment in FIGS. 3 and 5, the unlocking information of the system designated by reference 60 disappears in the lever in the locked position of the axial element and/or the locking information of the system designated by reference 62 disappears in the lever in the unlocked position of the axial element.

The unlocking and/or locking information 60, 62 here is arranged on an upper surface of the axial element 38, the lever 20 having an aperture 64 alternatively making it possible to view the locking and/or unlocking information.

The aperture has an oval shape.

The unlocking information 60 is arranged perpendicular to the locking information 62 by rotation around the rotation axis X, such that in case of rotation by a one-quarter revolution of the axial element 38 relative to the lever 20, the information visible through the aperture 64 goes from unlocking to locking or vice versa.

Figure 8:
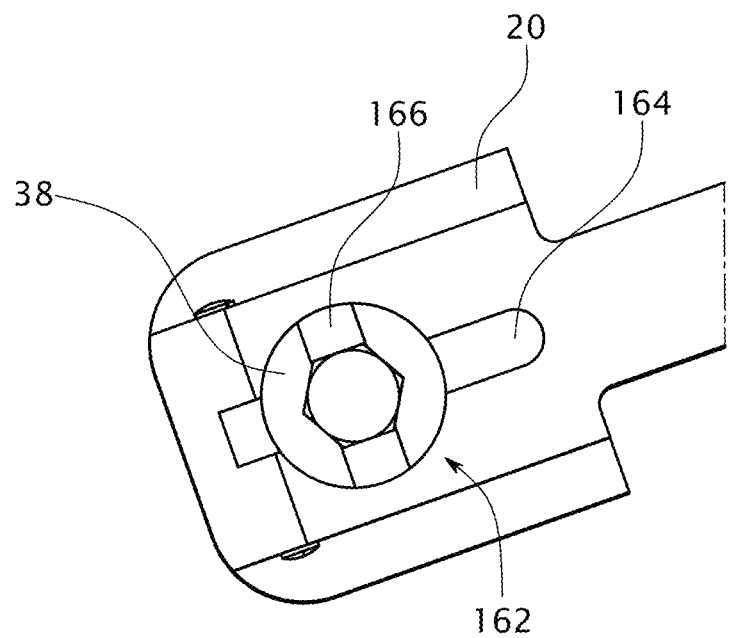
FIGS. 8 and 9 are top views of part of a fastening system according to an alternative embodiment of the invention.
Figure 9:
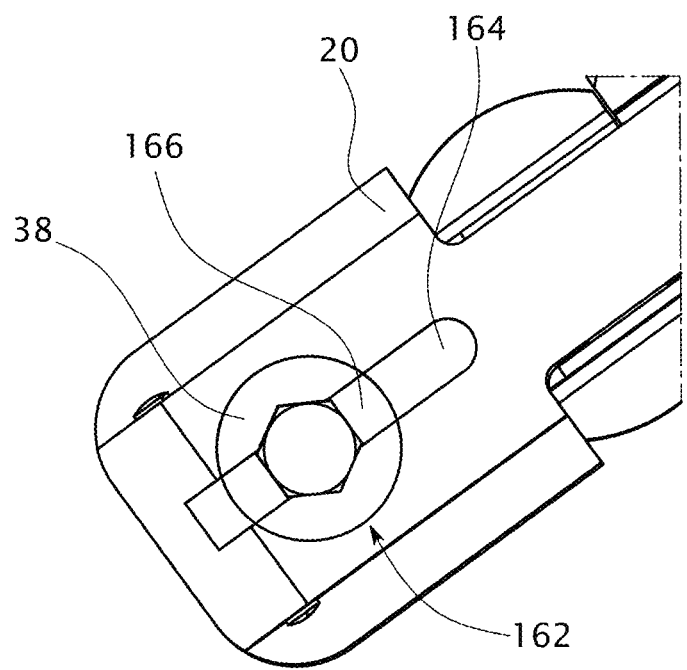

According to a second embodiment shown in FIGS. 8 and 9, the axial element 38 here bears locking information designated by reference 162.

The locking information comprises a first portion 164 on the lever 20 and a second portion 166 on an upper surface of the axial element 38.

In the locked position of the axial element, the first portion 164 and the second portion 166 are aligned, so as to form a continuous line. In the unlocked position of the axial element, the first portion 164 extends mainly perpendicular to the second portion 166, by the rotation of the axial element relative to the lever 20 between the unlocked position and the locked position.

The operator can thus quickly see whether the axial element is in the locked position.

The locking and/or unlocking information of the system in particular allows the operator easily to determine the position of the axial element.

The upper surface of the axial element 38 also comprises a blind hole forming a cavity 66 in the axial element 38. The cavity is accessible through the aperture 64 of the lever.

One can then see that the operation of this structure is as follows.

In the unlocked position, as illustrated in FIGS. 1, 3 and 4, the assembly operator can adjust the position of the seat, the fastening system moving on the rail, since it is neither pinched nor gripped.

Once in the desired position, the assembly operator lowers the lever from the position illustrated in FIG. 1 to the position illustrated in FIG. 2.

During this movement, the lever drives a pivoting of the articulation yoke, and therefore a movement of the front and rear connecting rods.

The articulation yoke 28 bears on the lateral protruding part to move the centering or indexing means 32, while the rear connecting rod tilts and causes pinching of the rail between the heels of the base and the gripping jaws.

This movement continues and causes crossing of the hard point after passing through the aligned position of the articulation points or fastening of the lever and connecting rods on the yoke.

The operator, by moving the lever 20 into the active position, inserts the locking pin into the slit.

The system is then in the gripping position, and the toggle joint mechanism for crossing hard points causes a reaction of the play related to the size variations of the parts.

Furthermore, the cam bears against the connecting rod 24 and pivots while opposing the cam spring 50 so as to release the automatic locking element 44. The latter drives a rotation of the axial element 38 and thus the movement of the indexing element in the slit.

This makes it possible to obtain fastening safety and locking in position, the locking pin preventing the release of the lever from the base. Indeed, the automatic locking element keeps the locking pin inserted in the slit by applying a rotational force, the locking pin not being able to be released from the slit by simple lifting of the lever.

The passage to the locked position is also quick and automatic.

When an operator next wishes to unlock the lever from the base to make it possible, for example, to adjust the position of the seat, he uses a tool having a shape complementary to the cavity 66 such as an Allen wrench to rotate the axial element 38 in the opposite direction, for example by a one-quarter revolution, relative to what was previously done.

Figure 7:
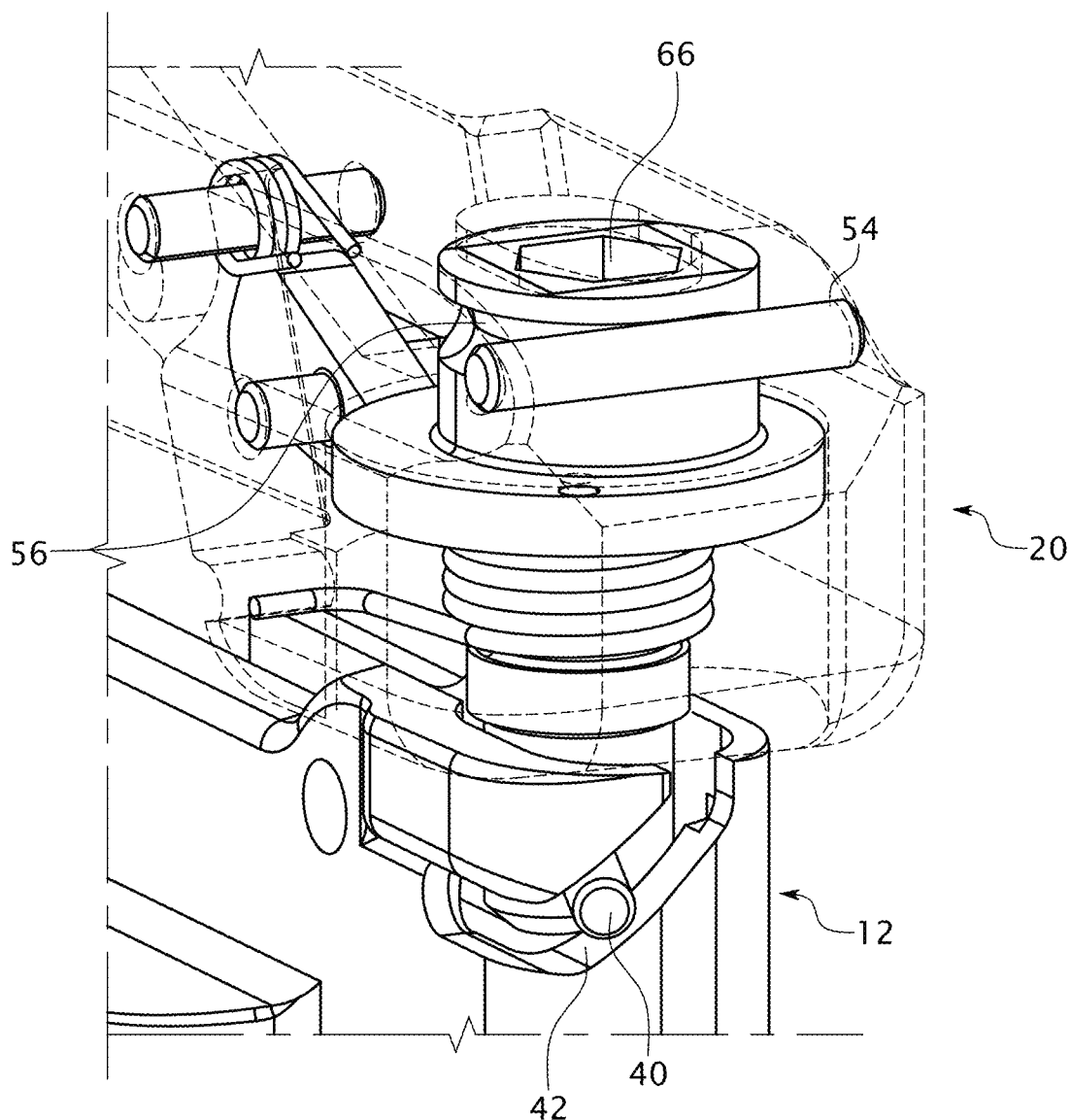
FIG. 7 is a perspective view of part of the system when the axial element goes from the locked position to the unlocked position.

The indexing element then bears on the slit provided in the base, as shown in FIG. 7, and is ultimately released from said slit.

In parallel, this causes the lever to be raised until causing the hard point to be crossed, opposite the foregoing.

Furthermore, under the action of its spring 50 and in the absence of bearing against the connecting rod 24, the cam 46 is placed back in its starting position against the stop element 48, the retaining contact then again opposing the automatic locking element.

The lever is then again in the free position as shown in FIGS. 3 and 4.

This system is therefore easy to use.

In one alternative embodiment not shown, the locking means differ from the embodiment previously described in that they are relatively reversed between the lever and the base.

More particularly, the axial element is rotatable relative to the base between an unlocked position and a locked position and the complementary element of the indexing element is comprised in the lever.

The axial element is mounted freely rotating on the base, so as only to allow a rotational movement of the axial element around a rotation axis X relative to the base.

The axial element for example passes through an orifice defined in the base.

Similarly to the preceding, the axial element is provided with an indexing element provided to engage with the complementary element, here the lever, in the blocking position of the axial element.

The complementary element is a slit similar to what was previously described, but defined by the lever.

Similarly, the means for locking in the active blocking position further comprise an automatic locking element designated by general reference.

The automatic locking element comprises a resilient urging member similar to before but inserted between the axial element and here the base.

The system further comprises an element for keeping the axial element in the unlocked position similar to what was previously described.

The system further comprises retaining means comprising a retaining pin secured to the base and a complementary machining on the axial element.

The retaining pin further makes it possible to maintain the first end of the axial element in the base.

Furthermore, the axial element here bears locking and/or unlocking information of the system depending on the position of the axial element relative to the base.

Many other embodiments may of course also be considered.

What is claimed is:

1. A fastening system for a seat including an aircraft seat in a rail of the rest of said aircraft, comprising:
    a base associated with the rest of the seat and being adapted to allow a grip of the seat by gripping on the rail, movable between a free position for assembly and/or disassembly of the seat and an active attachment position of the seat, via a maneuvering lever movable between the free position and an active position for blocking in the active attachment position of the seat, the lever being lockable in the active blocking position,
    wherein the lever is lockable by a system comprising an axle that is rotatable relative to one of the lever and the base between an unlocked position and a locked position, the axle being provided with an indexing element provided to engage with a complementary portion of the other of the lever and the base in the locked position of the axle,
    wherein the fastening system comprises:
        an automatic lock configured to lock the lever in the active blocking position with the axle in the locked position, and
        a retainer configured to keep the axle in the unlocked position,
        wherein the retainer forms a retaining contact with the axle when the lever is in the free position, the retaining contact opposing the automatic lock such that, when the lever is in the free position, the axle is kept in the unlocked position, and wherein, when the lever is moved into the active blocking position, the retainer is configured to free the automatic lock.

2. The fastening system according to claim 1, wherein the indexing element is a locking pin, the complementary portion being a slit defined by the other of the lever and the base, the locking pin being provided to cooperate with the slit.

3. The fastening system according to claim 2, wherein the slit opens into an upper surface of the other of the lever and the base and comprises a portion extending on a slant relative to said upper surface.

4. The fastening system according to claim 1, wherein the axle is mounted freely rotating on one of the lever and the base, so as only to allow a rotational movement of the axle around a rotation axis relative to one of the lever and the base.

5. The fastening system according to claim 1, wherein the axle passes through an orifice defined in one of the lever and the base.

6. The fastening system according to claim 1, wherein the automatic lock comprises a resilient urging member inserted between the axle and one of the lever and the base, the resilient urging member applying a rotational force to the axle to drive it in the locked position.

7. The fastening system according to claim 6, wherein the resilient urging member is a torsion spring having a first end fastened to the axle and a second end fastened to one of the lever and the base.

8. The fastening system according to claim 1, wherein the maintaining element is a cam mounted pivoting on one of the lever and the base, the axle having a stop, the cam being provided with a cam spring keeping the cam in contact with the stop in the free position of the lever so as to oppose the automatic lock, the cam pivoting in case of movement of the lever into the active position so as to free the automatic lock.

9. The fastening system according to claim 1, wherein the rotational movement of the axle is limited to a rotation between the unlocked position and the locked position.

10. The fastening system according to claim 1, wherein the axle bears locking and/or unlocking information of the system.

11. The fastening system according to claim 10, wherein the unlocking information of the system and/or the locking information of the system are configured to be modified in case of rotation of the axle relative to one of the lever and the base.

12. A fastening system for a seat including an aircraft seat in a rail of the rest of said aircraft, comprising:
  a base associated with the rest of the seat and being adapted to allow a grip of the seat by gripping on the rail, movable between a free position for assembly and/or disassembly of the seat and an active attachment position of the seat, via a maneuvering lever movable between the free position and an active position for blocking in the active attachment position of the seat, the lever being lockable in the active blocking position,
  wherein the lever is lockable by a system comprising an axle that is rotatable relative to one of the lever and the base between an unlocked position and a locked position, the axle being provided with an indexing element provided to engage with a complementary portion of the other of the lever and the base in the locked position of the axle,
  wherein the rotational movement of the axle is limited to a rotation between the unlocked position and the locked position, and
  wherein the rotational movement of the axle is limited by a system comprising a retaining pin secured to one of the lever and the base and a complementary machining on the axle, the retaining pin being inserted into the machining, the machining having a shape and a size such that it only allows the movement of the axle between the unlocked position and the locked position.

* * * * *